United States Patent [19]  
Gilliam et al.

[11] Patent Number: 4,767,530  
[45] Date of Patent: Aug. 30, 1988

[54] QUICK CHANGE OIL FILTER SYSTEM

[76] Inventors: Julius C. Gilliam, 11575 SW. 112th Ave., Miami, Fla. 33176; Alvin S. Blum, 2350 Del Mar Pl., Fort Lauderdale, Fla. 33301

[21] Appl. No.: 46,165

[22] Filed: May 5, 1987

Related U.S. Application Data

[63] Continuation-in-part of Ser. No. 870,989, Jun. 5, 1986, abandoned.

[51] Int. Cl.⁴ .................. B01D 27/08; B01D 29/38
[52] U.S. Cl. ........................... 210/232; 210/236; 210/443; 55/503
[58] Field of Search ............ 210/232, 237, 238, 440, 210/443; 55/503

[56] References Cited

U.S. PATENT DOCUMENTS

| | | | |
|---|---|---|---|
| 2,877,903 | 3/1959 | Veres | 210/262 |
| 3,615,018 | 10/1971 | Johnson | 210/232 |
| 3,722,683 | 3/1973 | Shaltis et al. | 210/440 |
| 3,774,769 | 11/1973 | Smith | 210/232 |
| 3,950,251 | 4/1976 | Hiller | 210/232 |
| 4,204,961 | 5/1980 | Cusata, Jr. | 210/232 |
| 4,231,872 | 11/1980 | Keil | 210/232 |
| 4,529,515 | 7/1985 | Selz | 210/238 |

FOREIGN PATENT DOCUMENTS 14970 4/1977 Japan ...................... 210/493.2

Primary Examiner—Richard V. Fisher  
Assistant Examiner—Wanda L. Millard  
Attorney, Agent, or Firm—Alvin S. Blum

[57] ABSTRACT

A quick change oil filter assembly for installation and removal of an oil filter on an engine without tools, skills or adjustments. A toggle action tightening band has two positions. In an open position the band is captive on the flange of a filter support plate with engine oil connections. A filter with a base flange is freely inserted or removed from the support plate. In the closed position, the band engages the flange on the filter base and draws it down against the flange of the support plate, compressing a sealing gasket between the flanges with a preset force. The tightening force is derived from inclined plane action of a sloping surface on the band engaging a sloping surface on a flange as the band diameter is reduced by the closing of the toggle lever. The toggle action of the closure ensures reproducible tightening forces to ensure leak proof sealing without adjustment.

20 Claims, 2 Drawing Sheets

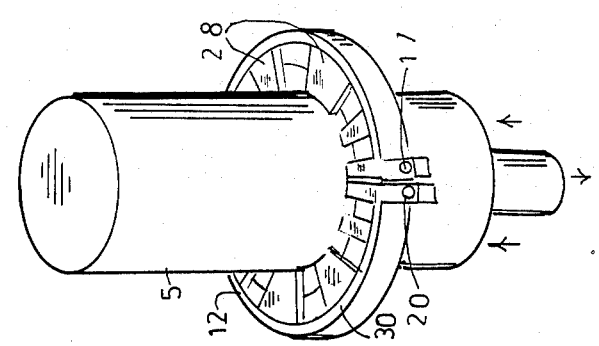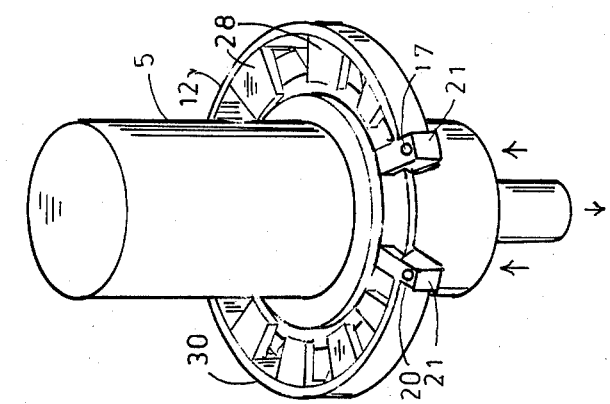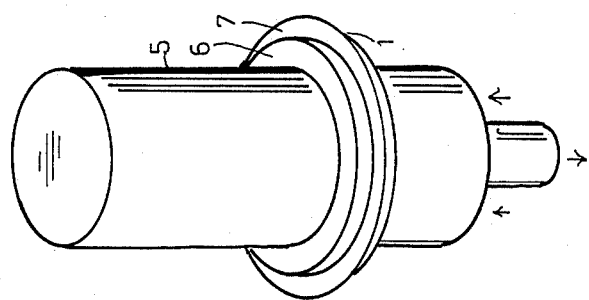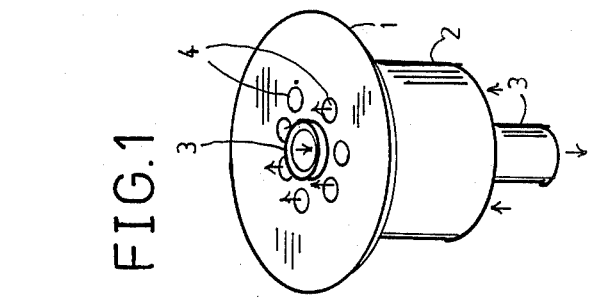

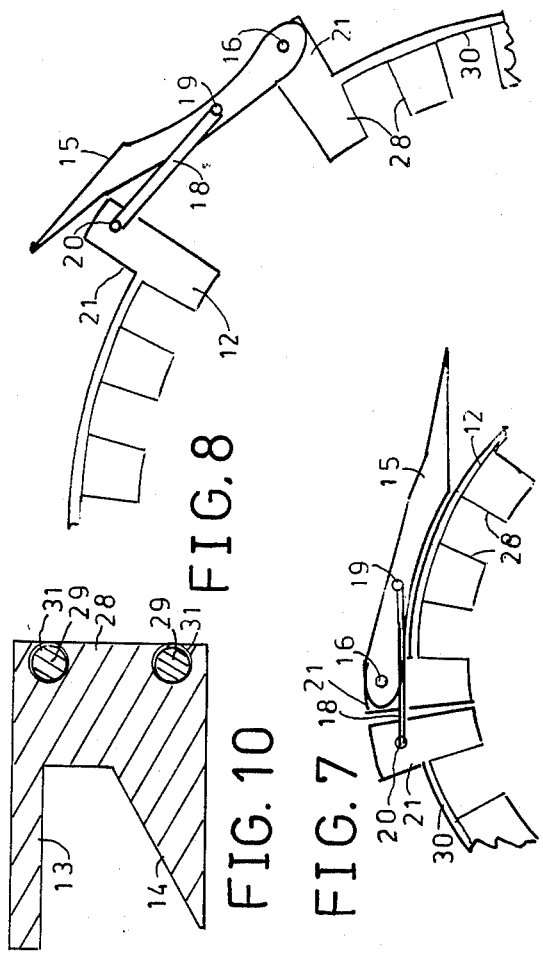
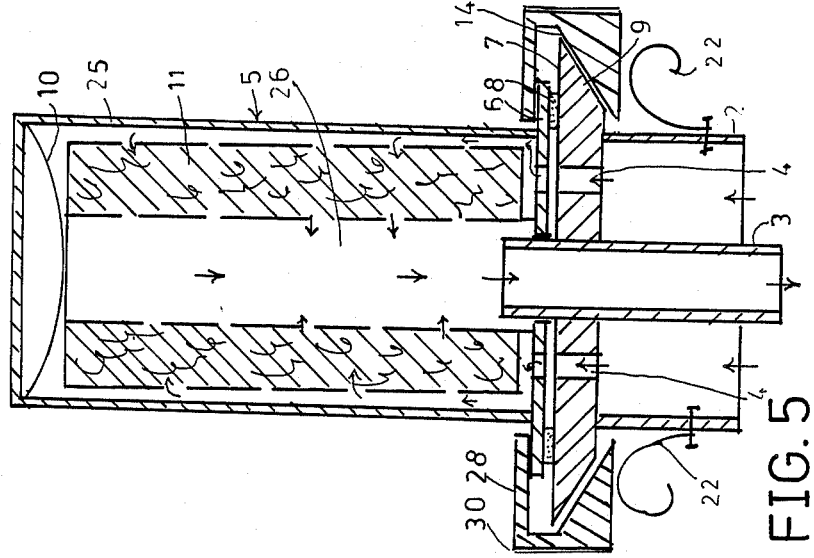
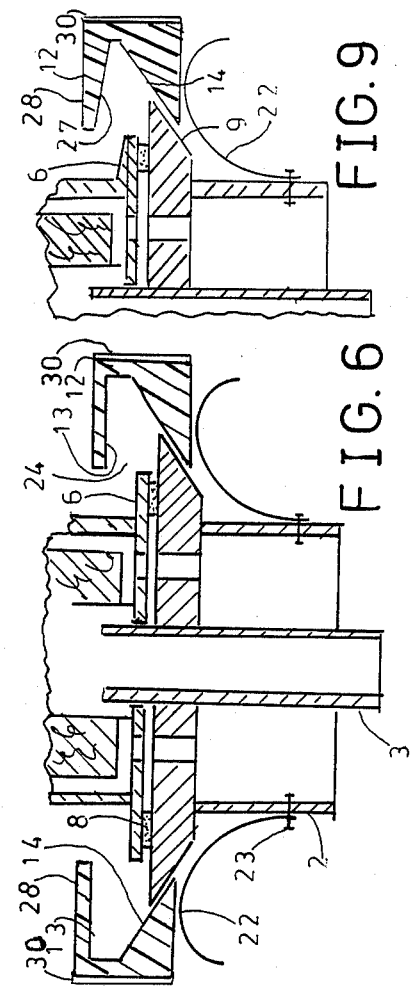

QUICK CHANGE OIL FILTER SYSTEM

This is a continuation-in-part of application Ser. No. 06/870,989 filed 6/5/86, now abandoned.

BACKGROUND OF THE INVENTION

Field of the Invention

This invention relates to oil filters for internal combustion engines and more particularly to systems for oil filter holders providing improved installation and removal mechanisms.

Search of the prior art revealed the following U.S. Pats. Nos. 3,950,251; 2,877,903. These inventions do not provide the advantages of the instant invention. Certain oil filters of the prior art have a dismountable outer cover. This cover may be removed and the filter element therein replaced. The cover is then replaced and fastened tightly with a fresh gasket in place for sealing. Sealing the cover oil tight generally involves tightening a bolt or screw to a prescribed torque to compress the gasket. And the gasket and sealing surfaces must be lubricated to ensure a reproducible degree of tightness. A totally replaceable "spinon" filter with integral cover in popular use screws onto a threaded pipe projecting from a sealing plate. The degree of tightness of screwing onto the pipe is critical to ensure compressing a gasket against the sealing plate sufficiently to prevent loss of oil and subsequent destruction of the engine. Furthermore, if the filter is overtightened, it may be difficult to remove after use, requiring a special wrench. Furthermore, if the filter is not correctly positioned at installation, the threads may be crossed, stripping them, or giving an incorrect indication of tightness, resulting in oil loss.

SUMMARY OF THE INVENTION

It is an object of the invention to provide a filter system wherein the filter element can be easily replaced without tools or special skills. It is a further object to provide a filter system wherein there are no screw threads involved in changing a filter. It is a further object to provide a filter system wherein a single lever motion always compresses a sealing gasket to the same degree to eliminate problems of over tightness or under tightness of seal. It is a further object to provide a filter system wherein there is no sliding motion between the gasket and the gasket sealing surfaces during the sealing process to avoid problems brought about by variations in the lubrication of the gasket. It is a further object to provide a filter system with a tightening band with at least one sloping engaging surface for combined engaging of a flange on the filter and a flange on the filter support plate. Said band uses toggle means to move from a large diameter, open, first position to a small diameter, closed, second position. In said open position, the band is disengaged from the flange of the oil filter so that it can be freely removed and replaced. In this position, the band is sufficiently engaged by the flange on the filter support plate that it is retained in place, ready to receive a new filter. When the toggle means moves the band from the open to the closed position, the sloping engaging surface of the band engages a mating sloping surface on at least one of the flanges and draws the two flanges together a fixed amount as the band moves inwardly, to compress the sealing gasket between the two flanges a fixed degree. The toggle means ensures the closing of the band to a fixed degree without adjustment, thereby eliminating a skill requirement in tightening. Spring means biasing said band against the flange of the support plate in the open position stabilizes the band, centers it, and leaves a space within the band large enough to receive the flange without requiring manipulation. Because all sealing and removal stresses are upon the flange of the filter, the remainder of the filter may be formed of less costly materials.

In order for the band to have sufficient up and down motion to provide clearance for the filter changing and for gasket compression, the inclined plane surfaces of the band must have considerable length. This leads to a band with a radial thickness that is so great that a solid band cannot move freely between open and closed positions. This band stiffness problem is overcome by construction of a segmented band comprised of a plurality of rigid, shaped segments joined together at the outer diameter by a thin, flexible continuous band. The segments move relative to one another as the thin outer band is opened and closed to perform the sliding and compressing functions as the segments engage the two flanges.

BRIEF DESCRIPTION OF THE DRAWINGS

FIG. 1 is a perspective view of the filter support plate.

FIG. 2 is a perspective view of the filter support plate with the filter in place.

FIG. 3 is a perspective view of the filter on the support plate with the tightening band open with the toggle mechanism absent.

FIG. 4 is a perspective view of the filter on the support plate with the tightening band closed with the toggle mechanism absent.

FIG. 5 is a cross sectional view of the filter system with the tightening band closed.

FIG. 6 is a cross sectional view of a portion of the filter system with the tightening band open.

FIG. 7 is a plan view of the toggle mechanism of the tightening band in closed position.

FIG. 8 is a plan view of the toggle mechanism of the tightening band in open position.

FIG. 9 is a cross sectional view of a portion of another embodiment of the filter system with the band open.

FIG. 10 is a cross sectional view of a segment using wires to join the segments.

DESCRIPTION OF PREFERRED EMBODIMENTS

Referring first to FIGS. 1 and 5, filter support plate 1 is mounted on concentric cylinders, outer cylinder 2 and inner cylinder 3. The cylinders may form a part of the engine or be mounted thereon by means well known in the art. In the embodiment shown, oil under pressure flows from the engine through the outer cylinder, and up through the ring of holes 4, through a filter that is sealed to the plate 1. Filtered oil returns to the engine through inner cylinder 3. The pattern of oil flow is indicated by the arrows. FIGS. 2 and 5 show the filter 5 mounted on the plate 1. Filter 5 has a flat flange 6. This rests upon the flange 7 of plate 1 with gasket 8 sandwiched between the two flat surfaces. The underside of plate flange 7 has a sloping surface 9. Spring 10 biases a filter element 11 tightly against filter flange 6 to direct the oil between the filter outer shell 25 and the filter element 11, then through the filter element 11 and into the central space 26 from which it passes through the inner cylinder 3 to return filtered oil to the engine. The instant invention relates to the mechanisms for installing, sealing and removing the filter. The internal structure of the filter and the mounting of the filter support on the engine may be those that are well known in the prior art. The instant invention may be usefully applied to and of these well known oil filters and filter supports.

A tightening band 12 has a flat upper surface 13 and a sloping lower surface 14. The flat upper surface 13 engages the flat flange 6 on the base of filter 5 and the sloping lower surface 14 engages the sloping surface 9 of the flange of filter support plate 1 when the band is tightened. The band 12 has two positions, an open position shown in FIGS. 3 and 6 and a closed position, shown in FIGS. 4 and 5. A toggle lever mechanism controls the opening and closing of the band. For clarity of illustration, it is not shown in FIGS. 3 and 4, but it is shown with a portion of the band in closed position in FIG. 7 and open position in FIG. 8. Other closure means such as cams may be used in the invention but a toggle mechanism is preferred for its positive locking feature and low cost.

In FIGS. 7 and 8, the toggle lever 15 pivots in hole 17 in projection 21 on band 12. Bail 18 in hole 19 on the lever and hole 20 on projection 21 on band 12 pulls both projections 21 on band together when lever 12 is moved to the closed position of FIG. 7. This reduced the diameter of the band. As the diameter of the band is reduced, the sloping lower face 14 of the band slides inwardly along the sloping under surface 9 of the plate flange 7 to the position of FIGS. 4 and 5. This action draws the flat upper surface 13 of the band tightly against the upper surface of filter flange 6, forcing the filter flange against the support plate 1 and compressing gasket 8 between the two flat surfaces.

The toggling action that ensures a reproducable degree of tightness by a simple lever closure operates in the following fashion. As lever 15 closes, pivot point 16 moves into a line between pivot points 19 and 20. When the lever moves beyond that point, band expanding forces will cause lever 15 to move all the way against band 12 as in FIG. 7. A plurality of springs 22 are compressed by the band as it closes and moves downward. The springs 22, connected to cylinder 2 by rivets 23, are in direct contact with band 12 at all times, exerting a continuous upward force. That upward force is translated to a band expanding force by the inclined plane action of the mating sloping surfaces.

When the lever 15 is moved to the open position of FIG. 8, the projections 21 of band 12 are forced apart as shown in FIGS. 6 and 3. This increased the diameter of the band, but the degree of opening is limited by the dimensions of lever 15 and its connections to band 12. The inside diameter of band 12 in the open position is larger than the diameter of the filter flange 6 permitting free passage of the filter for removal or installation. The springs 22 push the band upward to the position shown in FIG. 6, centering it on the flange of plate 1. Because the inside diameter of the band in open position is smaller than the plate 1, it is retained by the plate. The flat surface 13 of the band is positioned well above the upper surface of the plate 1, providing a centered space 24 between band and plate 1 to permit easy removal of the old filter and installation of the new filter without manipulation of the band.

As the lever is closed, and band diameter is reduced, the filter flange is engaged by the flat surface 13 of the band and pulled tightly against the plate by the inclined plane action of the two sloping surfaces 9 and 14. When the toggle action pulls lever 15 to its fully closed position, gasket 8 is always compressed to the necessary extent to ensure a leak-tight seal without adjustment. The forces on the gasket are all up and down, there are no sliding motions against the gasket that would be affected by lubrication of the gasket.

In the embodiment shown in FIG. 9, both the filter flange 6 and the plate flange 7 have sloping surfaces. Also both the filter flange engaging surface 27 and the plate flange engaging surface 14 are correspondingly sloped. When closed, the inner circumference of the band 12 must be less than that of flange 6 as shown in FIG. 4. When opened, the inner circumference of band 12 must be greater than that of flange 6 as shown in FIG. 3. If the band were made of a rubbery material it might stretch between these two dimensions. However, an easily stretched material might not have the rigidity necessary to pull the two flanges together in the closed position. A segmented band 12, as shown in FIGS. 3, 4, 7 and 8 and in section in FIGS. 5, 6, 9 and 10 has rigid, shaped segments 28 joined together by thin continuous strap 30 at their outer edge to form a composite tightening band. This structure has the flexibility necessary for easy opening and closing provided by the thin strap 30 and the rigidity in the vertical direction necessary for correct operation. The entire segmented band may be formed in one piece. Alternatively the segments 28 may be formed individually and joined to the strap 30 by welding, riveting, adhesive and other joining means well known in the art. In FIG. 10 the segments 28 are formed with two holes 31, and a pair of stainless steel wires 29, strung through all the holes 31, performs the strap function.

The above disclosed invention has a number of particular features which should preferably be employed in combination although each is useful separately without departure from the scope of the invention. While we have shown and described the preferred embodiments of our invention, it will be understood that the invention may be embodied otherwise than as herein specifically illustrated or described, and that certain changes in the form and arrangement of parts and the specific manner of practicing the invention may be made within the underlying idea or principles of the invention within the scope of the appended claims.

What is claimed is:

1. A quick-change fluid filter system for improved replacement of a filter assembly upon a filter support means with a sealing gasket, said filter assembly having integral fluid inlet and outlet means and said filter support means adapted for mounting on an engine and having inlet and outlet means connectable to said engine, comprising:

a filter assembly means with integral base plate means, said base plate means including fluid inlet and outlet means;

a filter flange means connected to, and coextensive with, said base plate means;

support plate means connected to said filter support means, said support plate means including fluid inlet and outlet means corresponding to, and adapted to connect to, said inlet and outlet means of said base plate means;

a support plate flange means connected to, and coextensive with, said support plate means;

a filter-engaging band means, said band means including a filter flange means engaging surface and a support plate flange means engaging surface;

a band closure means attached to said band means for reducing the diameter of said band means in a first, closed position and for increasing the diameter of said band means in a second, open positon of said band closure means;

said filter flange means engaging surface of said band means engaging said filter flange means as said band means is reduced in diameter and disengaging said filter flange means as said band means is increased in diameter;

said support plate flange means engaging surface of said band means having a sloped surface and said support plate flange means having a band engaging surface of substantially the same slope, said slope being such that reducing the diameter of said band means by said band closure means causes the sloping surface of said band means to move along the sloping surface of said plate flange means and forces the filter flange means engaging surface down upon the filter flange means, forcing said filter plate means tightly against said support plate means to compress said sealing gasket therebetween; and wherein said band means is captively held by said support plate flange means interposed between said engaging surfaces of said band means by said second, open position providing said band means with the inside diameter of both said flange means engaging surfaces smaller than the outside diameter of said support plate flange means and wherein said filter assembly is freely removable in said second, open position by said second position providing said inside diameter of said filter flange means engaging surface greater than said filter flange means.

2. The invention of claim 1, said band closure means including toggle closure means providing a fixed preset tension closure in said closed position, independent of the skills of the user, to ensure correct sealing forces to prevent leakage from inadequate tightness and damage from excessive tightening forces.

3. The invention of claim 1, including spring means connected to said filter support means and biasing against said band means, said biasing forcing said band means against said sloping surface of said support plate flange means and thereby urging an increased diameter of said band means to facilitate removal and replacement of said filter assembly in said open position.

4. The invention of claim 3, said spring means including centering means wherein said biasing centers said band means on said support plate means to facilitate installation of said filter assembly.

5. The invention of claim 4, including spreading means wherein said biasing forces said filter flange means engaging surface of said band means away from said support plate means to facilitate insertion of said filter flange means on said support plate means.

6. In the invention of claim 1, said filter flange means and said filter flange means engaging surface having sloped surfaces.

7. In the invention of claim 1, said filter support means forming an integral part of said engine.

8. A quick-change fluid filter system for improved replacement of a filter assembly upon a filter support means with a sealing gasket, said filter assembly having integral fluid inlet and outlet means and said filter support means adapted for mounting on an engine and having an inlet and outlet means connectable to said engine, including, support plate means connected to said filter support means, said support plate means including fluid inlet and outlet means corresponding to, and adapted to connect to, said inlet and outlet means of said filter assembly, a support plate flange means connected to, and coextensive with, said support plate means, a filter-engaging band means, said band means including a filter flange means engaging surface and a support plate flange means engaging surface, a band closure means attached to said band means for reducing the diameter of said band in a first, closed position and for increasing the diameter of said band in a second, open position of said band closure means, the improvement comprising:

a filter assembly means with integral base plate means, said base plate means including fluid inlet and outlet means;

a filter flange means connected to, and coextensive with, said base plate means;

said filter flange means engaging surface of said band means engaging said filter flange means as said band means is reduced in diameter and disengaging said filter flange means as said band means is increased in diameter;

said support plate flange means engaging surface of said band means having a sloped surface and said support plate flange means having a band engaging surface of substantially the same slope, said slope being such that reducing the diameter of said bands by said band closure means causes the sloping surface of said band means to move along the sloping surface of said plate flange means and forces the filter flange means engaging surface down upon said filter flange means, forcing said filter plate means tightly against said support plate means to compress said sealing gasket therebetween, and wherein said band means is captively held by said support plate flange means interposed between said engaging surfaces of said band means by said second, open position providing said band means with the inside diameter of both said flange means engaging surfaces smaller than the outside diameter of said support plate flange means and wherein said filter assembly is freely removable in said second, open position by said second position providing said inside diameter of said filter flange means engaging surface greater than said filter flange means.

9. The invention of claim 8, wherein said filter flange means provides a flat surface for engaging said filter flange means engaging surface.

10. The invention of claim 8, wherein said filter flange means provides a sloping surface for engaging said filter flange means engaging surface.

11. A quick-change fluid filter system for improved replacement of a filter assembly upon a filter support means with a sealing gasket, said filter assembly having integral fluid inlet and outlet means and said filter support means adapted for mounting on an engine and having inlet and outlet means connectable to said engine, comprising:

a filter assembly means with integral base plate means, said base plate means including fluid inlet and outlet means;

a filter flange means connected to, and coextensive with, said base plate means;

support plate means connected to said filter support means, said support plate means including fluid inlet and outlet means corresponding to, and adapted to connect to, said inlet and outlet means of said base plate means;

a support plate flange means connected to, and coextensive with, said support plate means;

a filter-engaging band means including a continuous outer portion and a segmented inner portion, said inner portion comprised of a plurality of radially disposed segments, each of said segments including a filter flange means engaging surface and a support plate means engaging surface, said segmented inner portion facilitating diametral changes of said band means;

a band closure means attached to said band means for reducing the diameter of said band means in a first, closed position and for increasing the diameter of said band means in a second, open position of said band closure means;

said filter flange means engaging surface of said band means engaging said filter flange means as said band means is reduced in diameter and disengaging said filter flange means as said band means is increased in diameter;

said support plate flange means engaging surface of said band means having a sloped surface and said support plate flange means having a band engaging surface of substantially the same slope, said slope being such that reducing the diameter of said band means by said band closure means causes the sloping surface of said band means to move along the sloping surface of said plate flange means and forces the filter flange means engaging surface down upon the filter flange means, forcing said filter plate means tightly against said support plate means to compress said sealing gasket therebetween; and wherein said band means is captively held by said support plate flange means interposed between said engaging surfaces of said band means by said second, open position providing said band means with the inside diameter of both said flange means engaging surfaces smaller than the outside diameter of said support plate flange means and wherein said filter assembly is freely removable in said second, open position by said second position providing said inside diameter of said filter flange means engaging surface greater than said filter flange means.

12. The invention of claim 11, said band closure means including toggle closure means providing a fixed preset tension closure in said closed position, independent of the skills of the user, to ensure correct sealing forces to prevent leakage from inadequate tightness and damage from excessive tightening forces.

13. The invention of claim 11, including spring means connected to said filter support means and biasing against said band means, said biasing forcing said band means against said sloping surface of said support plate flange means and thereby urging an increased diameter of said band means to facilitate removal and replacement of said filter assembly in said open position.

14. The invention of claim 13, said spring means including centering means wherein said biasing centers said band means on said support plate means to facilitate installation of said filter assembly.

15. The invention of claim 14, including spreading means wherein said biasing forces said filter flange means engaging surface of sand band means away from said support plate means to facilitate insertion of said filter flange means on said support plate means.

16. In the invention of claim 11, said filter flange means and said filter flange means engaging surface having sloped surfaces.

17. In the invention of claim 11, said filter support means forming an integral part of said engine.

18. A quick-change fluid filter system for improved replacement of a filter assembly upon a filter support means with a sealing gasket, said filter assembly having integral fluid inlet and outlet means and said filter support means adapted for mounting on an engine and having inlet and outlet means connectable to said engine, including, support plate means connected to said filter support means, said support plate means including fluid inlet and outlet means corresponding to, and adapted to connect to, said inlet and outlet means of said filter assembly, a support plate flange means connected to, and coextensive with, said support plate means, a filter-engaging band means including a continuous outer portion and a segmented inner portion, said inner portion comprised of a plurality of radially disposed segments, each of said segments including a filter flange engaging surface and a support plate flange means engaging surface said segmented inner portion facilitating diametral changes of said band means;

a band closure means attached to said band means for reducing the diameter of said band in a first, closed position and for increasing the diameter of said band in a second, open position of said band closure means, the improvement comprising:

a filter assembly means with integral base plate means, said base plate means including fluid inlet and outlet means;

a filter flange means connected to, and coextensive with, said base plate means;

said filter flange means engaging surface of said band means engaging said filter flange means as said band means is reduced in diameter and disengaging said filter flange means as said band means is increased in diameter;

said support plate flange means engaging surface of said band means having a sloped surface and said support plate flange means having a band engaging surface of substantially the same slope, said slope being such that reducing the diameter of said bands by said band closure means causes the sloping surface of said band means to move along the sloping surface of said plate flange means and forces the filter flange means engaging surface down upon said filter flange means, forcing said filter plate means tightly against said support plate means to compress said sealing gasket therebetween, and wherein said band means is captively held by said support plate flange means interposed between said engaging surfaces of said band means by said second, open position providing said band means with the inside diameter of both said flange means engaging surfaces smaller than the outside diameter of said support plate flange means and wherein said filter assembly is freely removable in said second, open position by said second position providing said inside diameter of said filter flange means engaging surface greater than said filter flange means.

19. The invention of claim 18, wherein said filter flange means provides a flat surface for engaging said filter flange means engaging surface.

20. The invention of claim 18, wherein said filter flange means provides a sloping surface for engaging said filter flange means engaging surface.

* * * * *